United States Patent [19]

Yamazaki et al.

[11] 4,296,418
[45] Oct. 20, 1981

[54] INK JET PRINTING APPARATUS WITH REVERSE SOLVENT FLUSHING MEANS

[75] Inventors: Hiroshi Yamazaki; Takuro Isayama, both of Tokyo, Japan

[73] Assignee: Ricoh Company, Ltd., Tokyo, Japan

[21] Appl. No.: 158,335

[22] Filed: May 23, 1980

[30] Foreign Application Priority Data

May 26, 1979 [JP] Japan .................. 54-64603

[51] Int. Cl.³ .......................................... G01D 15/18
[52] U.S. Cl. ................................ 346/75; 346/140 R
[58] Field of Search .............. 346/75, 140 IJ, 140 PD

[56] References Cited

U.S. PATENT DOCUMENTS

| 3,346,869 | 10/1967 | Stone | 346/75 |
| 3,839,721 | 10/1974 | Chen et al. | 346/75 |
| 3,945,020 | 3/1976 | Kraus et al. | 346/75 |
| 4,045,802 | 8/1977 | Fukazawa et al. | 346/75 X |
| 4,050,078 | 9/1977 | Isayama et al. | 346/140 IJ |
| 4,112,435 | 9/1978 | Kattner et al. | 346/140 PD |
| 4,223,324 | 9/1980 | Yamamori et al. | 346/140 PD |
| 4,228,442 | 10/1980 | Krull | 346/140 PD |

Primary Examiner—George H. Miller, Jr.
Attorney, Agent, or Firm—David G. Alexander

[57] ABSTRACT

An ink clog is automatically sensed in an ink ejection nozzle (14). The clog is cleared by moving a cap (28) into covering engagement with the nozzle orifice, causing solvent to flow through the nozzle (14) from the cap (28) to dissolve the clogged ink and subsequently causing air to flow through the cap (28) and nozzle (14) to purge solvent therefrom.

6 Claims, 5 Drawing Figures

INK JET PRINTING APPARATUS WITH REVERSE SOLVENT FLUSHING MEANS

BACKGROUND OF THE INVENTION

The present invention relates to an ink jet printing apparatus comprising means for automatically sensing and removing an ink clog.

Although ink jet printers offer many advantages, the ink ejection nozzles thereof are prone to ink clogs. Various proposals have been made to automatically sense and clear ink clogs but none of these have proven entirely effective.

One prior art arrangement which is applicable to a deflection type system is to increase the ink pressure while vibrating the nozzle with a vibrator. Another proposal which may be applied to deflection type systems and ink on demand systems is to vibrate and heat the nozzle. However, none of these arrangements are entirely effective.

Other expedients to prevent nozzle clogs include vibrating the nozzle weakly when the printer is not in actual operation, placing a cap on the nozzle and filling it with solvent and circulating solvent through the nozzle when the printer is not in operation. Although these systems are applicable to both deflection type and demand type printing apparatus, they are incapable of preventing ink clogs caused by introduction of dirt when replacing a filter, maintenance of a pressure regulator valve, solidification of ink during a long period of non-use, introduction of fine dust particles through the nozzle and the like. Merely increasing the ink pressure cannot clear a serious clog and imposes a strain on the nozzle and piping.

SUMMARY OF THE INVENTION

An ink jet printing apparatus embodying the present invention includes nozzle means for ejecting a jet of ink and ink supply means for supplying ink to the nozzle means, and is characterized by comprising sensor means for sensing an ink clog in the nozzle means, cap means for covering the nozzle means, solvent supply means for supplying solvent to the cap means, and control means for moving the cap means into covering engagement with the nozzle means and controlling the solvent supply means to supply solvent to the cap means in response to the sensor means sensing the ink clog.

In accordance with the present invention, an ink clog is automatically sensed in an ink ejection nozzle. The clog is cleared by moving a cap into covering engagement with the nozzle orifice, causing solvent to flow through the nozzle from the cap to dissolve the clogged ink and subsequently causing air to flow through the cap and nozzle to purge solvent therefrom.

It is an object of the present invention to provide an ink jet printing apparatus comprising effective means for automatically sensing an ink clog and clearing the same.

It is another object of the present invention to provide a generally improved ink jet printing apparatus.

Other objects, together with the foregoing, are attained in the embodiments described in the following description and illustrated in the accompanying drawing.

DESCRIPTION OF THE PREFERRED EMBODIMENTS

While the ink jet printing apparatus of the present invention is susceptible of numerous physical embodiments, depending upon the environment and requirements of use, substantial numbers of the herein shown and described embodiments have been made, tested and used, and all have performed in an eminently satisfactory manner.

Figure 1:
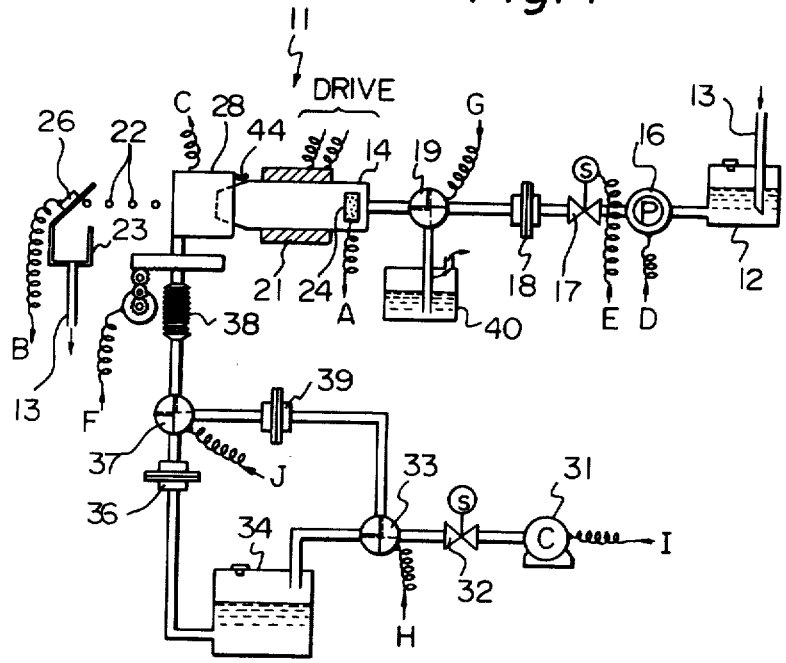
FIG. 1 is a schematic diagram of an ink jet printing apparatus embodying the present invention.

Referring now to FIG. 1 of the drawing, an ink jet printing apparatus embodying the present invention is generally designated by the reference numeral 11 and comprises an ink container or tank 12. Ink is fed from the tank 12 to an ink ejection nozzle 14 by means of a low pressure supply pump 16, a pressure control and shut off valve 17, a filter 18 and a three way control valve 19. A drive signal applied to a piezoelectric element 21 causes a jet of ink drops 22 to be ejected from the nozzle 14 orifice in the leftward direction. A sheet of paper is moved between the nozzle 14 and a gutter 23 for printing, although not illustrated, in a known manner. The gutter 23 catches ink drops which do not impinge against the paper and returns the same to the container 12 through a tube 13. Where the apparatus 11 operates as a deflection type printer, the drive signal is applied continuously and a deflection signal is applied to a deflection electrode (not shown) when it is desired to print a dot. The deflection signal deflects the ink jet so that it impinges against the paper instead of the gutter 23. Where the apparatus 11 is operated as an ink on demand apparatus, the drive signal is applied only when it is desired to print a dot and the ink jet is ejected only in response to the drive signal.

In accordance with the present invention, a sensor 24 is provided to the nozzle 14 to sense the ink pressure inside the nozzle 14. The sensor 24 produces a signal A which has a magnitude proportional to the pressure in the nozzle 14. If the nozzle 14 is clogged, the pressure will be higher than normal and the magnitude of the signal A will be above a predetermined reference value VR indicating a clogged condition.

Another sensor 26 is provided to the gutter 23. The sensor 26 produces a high signal B when the ink jet hits a predetermined position on the gutter 23. In combination, the sensors 24 and 26 are capable of sensing for essentially all clogging conditions. For example, if dirt adheres to the orifice of the nozzle 14 or ink drips down the orifice of the nozzle 14, the pressure in the nozzle 14 will be normal and the signal A will be low but the ink jet will not hit the proper position on the gutter 23. This would cause distorted printing since the ink jet would be displaced form the proper position. In this case, the signal B from the sensor 26 would be low indicating a clogged condition.

Another example is where the ink gradually solidifies in the area of the orifice of the nozzle 14 thereby reducing the area of the nozzle. Although ink is ejected to the proper position for printing and the output of the sensor 26 is high, the ink drop diameter is too low and the printing density is also low. In this case, the sensor 24 produces a high signal A indicating overpressure and a clogged condition.

Figure 2:
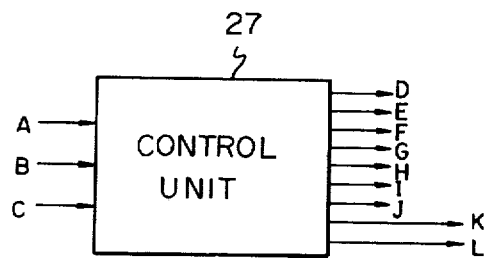
FIG. 2 is a diagram of a control means of the apparatus illustrating various control signals.

As shown in FIG. 2, the apparatus 11 comprises a control unit 27 which receives the signals A and B and produces signals D to L in response thereto.

The apparatus 11 further comprises a cap 28 which is movable by means of an X-Y drive 29 into and out of engagement with the nozzle 14. When out of engagement with the nozzle 14, the cap 28 is clear of the path of the jet 22 since is moved downwardly away therefrom.

A compressor 31 is constructed to produce pressurized air which may be applied to a solvent tank 34 through a pressure regulator valve 32 and a three way valve 33. The tank 34 contains a solvent which is capable of dissolving the ink. The solvent tank 34 may communicate with the cap 28 through a filter 36, three way valve 37 and flexible connector 38. The compressor 31 may also be communicated with the cap 28 directly through the valve 33, a filter 39 and the valve 37. The nozzle 28 may also communicate with a solvent receiver container or tank 40 through the valve 19. The tank 40 is vented to the atmosphere.

Figure 3:
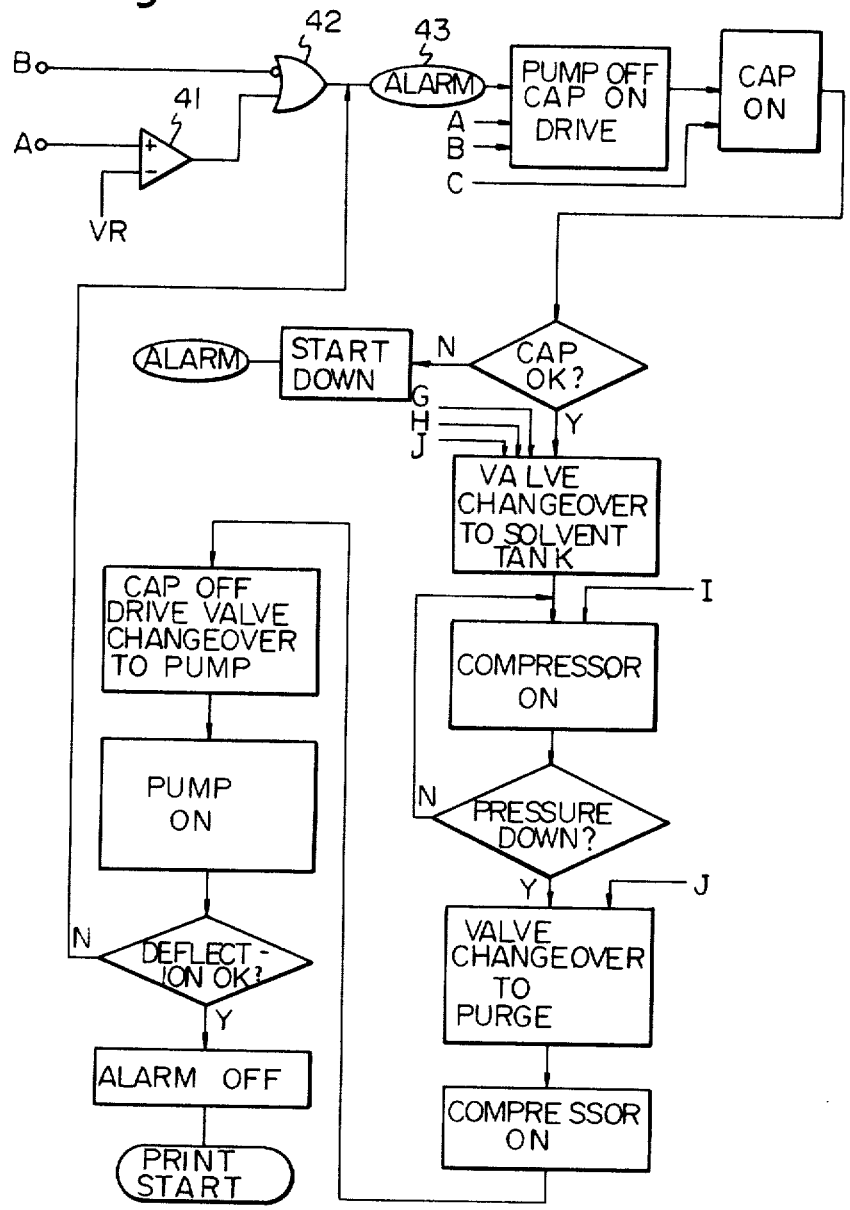
FIG. 3 is a diagram, partially in flowchart form, illustrating the operation of the present invention.

The general operation of the present apparatus 11 will now be described with reference to FIG. 3.

The signal A is applied to a non-inverting input of a comparator 41. The reference voltage VR is applied to an inverting input of the comparator 41. The comparator 41 produces a high output when the signal A is higher in magnitude than the signal VR and the pressure in the nozzle 14 is above a predetermined value indicating a clogged condition. The output of the comparator 41 is connected to an input of an OR gate 42, the output of which is connected to an alarm 43. The signal B is applied to an inverting input of the OR gate 42. Thus, the output of the OR gate 42 will go high in response to sensing of a clog by the sensor 24 and/or 26 and energize the alarm 43. The remainder of FIG. 3 is in flowchart form and will be described appropriately.

During normal operation of the apparatus 11, the valve 19 connects the nozzle 14 to the pump 16. The pump 16 is on, the valve 17 is open and ink is supplied to the nozzle 14 for ejection. The cap 28 is detached from the nozzle 14, the compressor 31 is off and the valves 33 and 37 are closed to prevent evaporation of the solvent from the tank 34.

In response to a clog signal A or B, the alarm 43 is turned on by the signal K and the control unit 27 generates the signal F which causes the drive 29 to move the cap 28 into engagement with the nozzle 14 to cover the orifice thereof. Signals D and E turn off the pump 16 and close the valve 17 respectively.

The cap 28 is provided with a sensor switch 44 which is closed to produce a low signal C when the cap 28 properly engages with the nozzle 14. If the cap 28 does not properly engage with the nozzle 14, the entire apparatus 11 is shut down and another alarm is energized to annunciate a malfunction of the drive 29.

If the cap 28 properly engages with the nozzle 14 and the signal C goes low, the control unit 27 generates signals G, H and J which change over the valves 19, 33 and 37 respectively. The valve 19 connects the nozzle 14 to the tank 40. The valve 33 connects the compressor 31 to the tank 34. The valve 37 connects the tank 34 to the cap 28. Then, the control unit 27 generates the signal I which turns on the compressor 31. This causes solvent from the tank 34 to flow through the valve 37, cap 28 and nozzle 14 into the tank 40 to dissolve the clogged ink in the nozzle 14.

The clearing operation continues until the output of the sensor 24 (the signal A) goes low. In response, the control unit 27 generates the signal J which changes over the valve 37 to connect the compressor 31 to the cap 28. This causes air from the compressor 31 to flow through the cap 28, nozzle 14 and tank 40 into the atmosphere to purge the solvent from the nozzle 14.

After a predetermined period of time, the control unit 27 generates the signal F to cause the drive 29 to move the cap 28 away from the nozzle 14. At this time, the compressor 31 is shut down, the valves 33 and 37 are closed and the valve 19 is changed over to connect the pump 16 to the nozzle 14. If the signal B is high, indicating proper deflection, the alarm 43 is turned off and normal printing is resumed. If the signal B is low, the clearing operation is repeated in response to the signal L.

Figure 4:
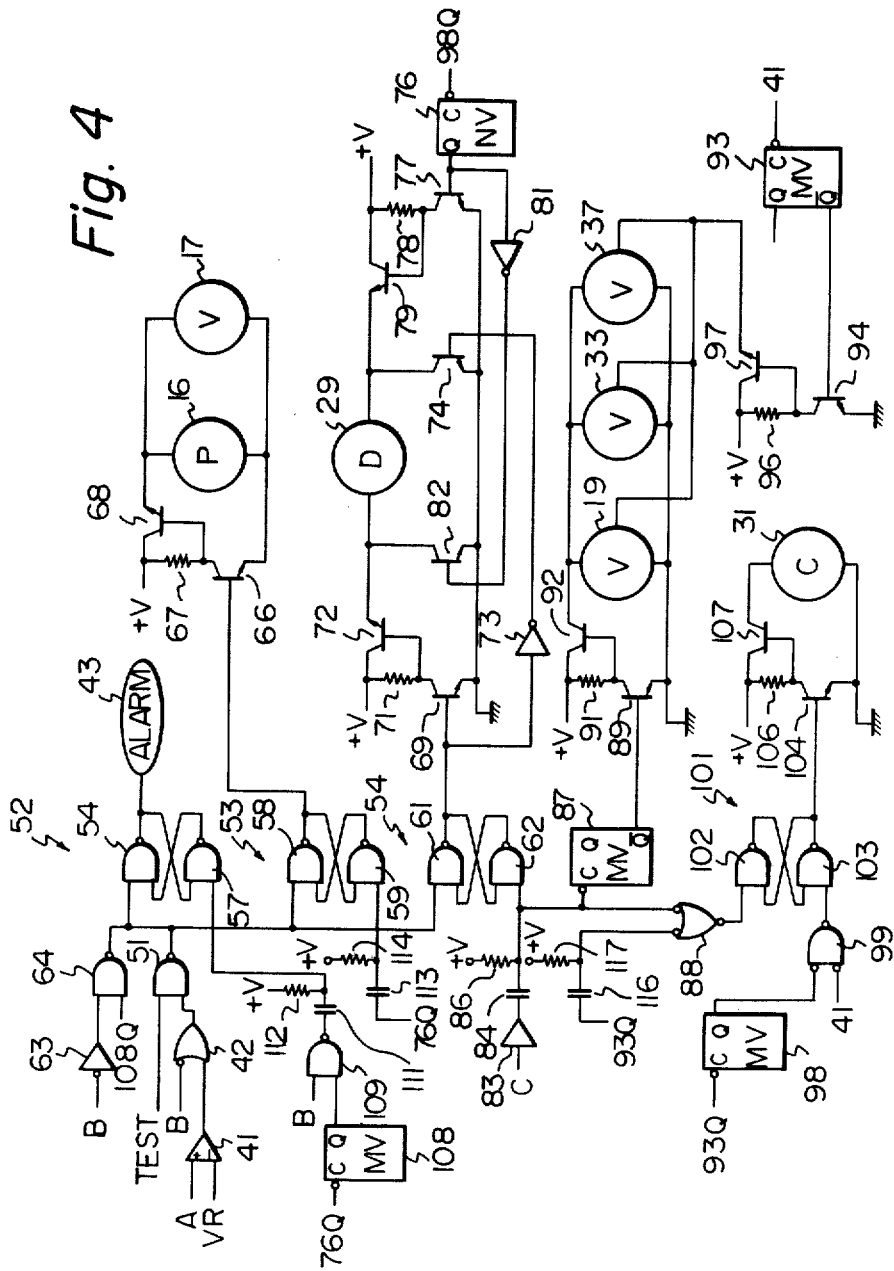
FIG. 4 is an electrical schematic diagram of the present apparatus.

The apparatus 11 is illustrated in greater detail in FIG. 4. The output of the OR gate 42 is connected to an input of a NAND gate 51, the output of which is connected to set inputs of flip-flops 52, 53 and 54 respectively. A test signal is applied to the other input of the NAND gate 51. The flip-flop 52 consists of cross coupled NAND gates 56 and 57 and operates as a negative logic set-reset flip-flop. In other words, the flip-flop 52 is changed over in response to logically low input levels. The output of the NAND gate 56, which constitutes the Q output of the flip-flop 52, is connected to the alarm 43. The flip-flops 53 and 54 are identical to the flip-flop 52 and consist of cross coupled NAND gates 58 and 59 and 61 and 62 respectively.

The signal B is applied through an inverter 63 to an input of a NAND gate 64 which has its output connected to the output of the NAND gate 51 in a wired-OR configuration.

The output of the NAND gate 58 is connected to the base of an NPN transistor 66, the emitter of which is connected to the pump 16 and valve 17. The collector of the transistor 66 is connected through a resistor 67 to a source +V and also to the base of a power transistor 68. The collector of the transistor 68 is connected to the source +V whereas the emitter of the transistor 68 is connected to the other ends of the pump 16 and valve 17.

The output of the NAND gate 61 is connected to the base of a transistor 69, the emitter of which is grounded and the collector of which is connected to the source +V through a resistor 71. The collector of the transistor 69 is also connected to the base of a transistor 72. The collector of the transistor 72 is connected to the source +V whereas the emitter of the transistor 72 is connected to the drive 29.

The output of the NAND gate 61 is also connected through an inverter 73 to the base of a transistor 74. The emitter of the transistor 74 is grounded and the collector of the transistor 74 is connected to the other end of the drive 29.

The Q output of a monostable multivibrator 76 is connected to the base of a transistor 77, the emitter of which is grounded. The collector of the transistor 77 is connected through a resistor 78 to the source +V and also to the base of a transistor 79. The collector of the transistor 79 is connected to the source +V whereas the emitter of the transistor 79 is connected to the drive 29.

The Q output of the multivibrator 76 is also connected through an inverter 81 to the base of a transistor 82. The emitter of the transistor 82 is grounded and the collector of the transistor 82 is connected to the drive 29.

The signal C is applied through a buffer 83 and capacitor 84 to the reset input of the flip-flop 54. A resistor 86 is connected between the input of the NAND gate 62 and the source +V. The signal C is also applied to an inverting clock or trigger input of a multivibrator 87 and also to an inverting input of a NOR gate 88.

The $\bar{Q}$ output of the multivibrator 87 is connected to the base of a transistor 89, the emitter of which is grounded. The collector of the transistor 89 is connected to the source +V through a resistor 91 and also to the base of a transistor 92. The collector of the transistor 92 is connected to the source +V whereas the emitter of the transistor 92 is connected to the valves 19, 33 and 37.

The $\bar{Q}$ output of a multivibrator 93 is connected to the base of a transistor 94, the emitter of which is grounded. The collector of the transistor 94 is connected to the source +V through a resistor 96 and also to the base of a transistor 97. The collector of the transistor 97 is connected to the source +V whereas the emitter of the transistor 97 is connected to the valves 19, 33 and 37.

The Q output of a multivibrator 98 is connected to an inverting input of a NAND gate 99, the output of which is connected to the reset input of a flip-flop 101 consisting of cross coupled NAND gates 102 and 103. The output of the NOR gate 88 is connected to the set input of the flip-flop 101. The output of the NAND gate 103, constituting the $\bar{Q}$ output of the flip-flop 101, is connected to the base of a transistor 104.

The emitter of the transistor 104 is grounded and the collector of the transistor 104 is connected to the source +V through a resistor 106. The collector of the transistor 104 is also connected to the base of a transistor 107, the collector of which is connected to the source +V. The emitter of the transistor 107 is connected through the compressor 31 to ground.

The Q output of a multivibrator 108 is connected to an input of a NAND gate 109, the output of which is connected through a capacitor 111 and resistor 112 to the source +V and also to an input of the NAND gate 57. The signal B is applied to another input of the NAND gate 109.

The Q output of the multivibrator 76 is connected to an inverting trigger input of the multivibrator 108. The Q output of the multivibrator 76 is also connected through a capacitor 113 and resistor 114 to the source +V and to an input of the NAND gate 59.

The Q output of the multivibrator 93 is connected through a capacitor 116 and resistor 117 to the source +V and also to an inverting input of the NOR gate 88. The Q output of the multivibrator 93 is also connected to an inverting trigger input of the multivibrator 98. The output of the comparator 41 is connected to an inverting input of the NAND gate 99 and also to an inverting trigger input of the multivibrator 93. The Q output of the multivibrator 98 is connected to an inverting trigger input of the multivibrator 76. The Q output of the multivibrator 108 is connected to an input of the NAND gate 64.

Figure 5:
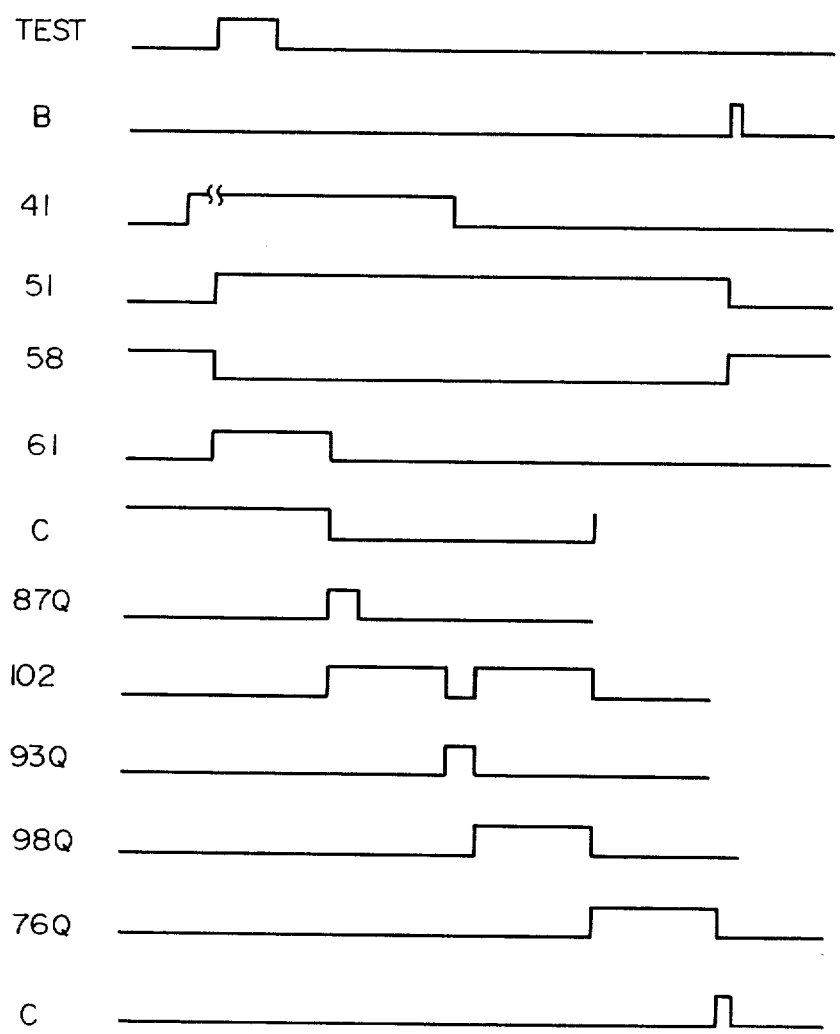
FIG. 5 is a timing diagram illustrating the operation of the present invention.

The operation of the circuit of FIG. 4 will now be described with reference also being made to the timing diagram of FIG. 5.

The circuit operation is initiated by the test signal which is generated when the paper is not in front of the gutter 23. The test signal enables the NAND gate 51. Assuming that the nozzle 14 is clogged, the signal A will be high and the signal B will be low. Thus, the output of the NAND gate 51 goes low setting the flip-flops 52, 53 and 54. The high output of the NAND gate 56 energizes the alarm 43. The high output of the NAND gate 58 turns on the transistor 66 which turns off the transistor 68. This turns off the pump 16 and closes the valve 17. The high output of the NAND gate 61 turns on the transistor 69 which turns off the transistor 72. Since the Q output of the multivibrator 76 is low, the transistor 77 is turned off to turn on the transistor 79. The transistor 82 is turned on through the inverter 81. Thus, the drive 29 is energized through the transistors 79 and 82 in a direction to move the cap 28 into engagement with the nozzle 14.

When the cap 28 properly engages with the nozzle 14 the signal C goes low and resets the flip-flop 54 to turn off the drive 29. The low signal C also triggers the multivibrator 87 and sets the flip-flop 101. The low output of the NAND gate 103 turns off the transistor 104 which turns on the transistor 107 and thereby the compressor 31. The low $\bar{Q}$ output of the multivibrator 87 turns off the transistor 89 which turns on the transistor 92. The valves 19, 33 and 37 are changed over by the transistor 92 to connect the nozzle 14 to the container 40, connect the compressor 31 to the tank 34 and connect the tank 34 to the cap 28. Thus, solvent is casued to flow through the cap 28 and nozzle 14 to dissolve the clogged ink. This action continues until the signal A goes low indicating that the clog has been removed.

The low signal A causes the output of the comparator 41 to go low and reset the flip-flop 101 through the NAND gate 99. The low output of the comparator 41 also triggers the multivibrator 93. The low $\bar{Q}$ output of the multivibrator 93 turns off the transistor 94 which turns on the transistor 97 and changes over the valves 19, 33 and 37 in the opposite direction to connect the compressor 31 directly to the cap 28 through the valve 33, filter 39 and valve 37. The high output of the NAND gate 103 turns off the compressor 31.

When the multivibrator 93 times out, the falling Q output thereof sets the flip-flop 101 through the NOR gate 88 and thereby turns on the compressor 31. The falling Q output of the multivibrator 93 also triggers the multivibrator 98. Air is pumped through the cap 28 and nozzle 14 until the multivibrator 98 times out.

When the multivibrator 98 times out, the falling Q output thereof triggers the multivibrator 76. The high Q output of the multivibrator 76 turns on the transistor 77 and turns off the transistors 79 and 82. However, the low output of the NAND gate 61 turns off the transistor 69 and turns on the transistors 72 and 74, thereby energizing the drive 29 in the opposite direction to move the cap 28 away from the nozzle 14.

When the multivibrator 76 times out, the falling Q output thereof resets the flip-flop 53 and turns on the pump 16 and opens the valve 17. This causes ink to be ejected from the nozzle 14 to the gutter 23. The falling Q output of the multivibrator 76 also triggers the multivibrator 108. The high Q output of the multivibrator 108 enables the NAND gates 64 and 109. If the ink hits the gutter 23 properly, the signal B will be high and the flip-flop 52 will be reset via the NAND gate 109 to turn off the alarm 43 and resume normal operation of the apparatus 11. If, however, the ink jet does not hit the proper position on the gutter 23, the flip-flops 53 and 54 will be set via the NAND gate 64 to repeat the clearing operation.

In summary, it will be seen that the present invention overcomes the drawbacks of the prior art and provides an ink jet printing apparatus comprising effective means for automatically sensing and clearing an ink clog. Various modifications will become possible for those skilled in the art after receiving the teachings of the present disclosure without departing from the scope thereof.

What is claimed is:

1. An ink jet printing apparatus including nozzle means for ejecting a jet of ink and ink supply means for supplying ink to the nozzle means, characterized by comprising:

sensor means for sensing an ink clog in the nozzle means;

cap means for covering the nozzle means;

solvent supply means for supplying solvent to the cap means; and control means for moving the cap means into covering engagement with the nozzle means and controlling the solvent supply means to supply solvent to the cap means in response to the sensor means sensing the ink clog.

2. An apparatus as in claim 1, further comprising solvent receiving means and valve means for selectively connecting the nozzle means to the ink supply means and the solvent receiving means, the control means normally controlling the valve means to connect the nozzle means to the ink supply means and controlling the valve means to connect the nozzle means to the solvent receiving in response to the sensor means sensing the ink clog so that the solvent is caused to flow through the nozzle means from the cap means to the solvent receiving means.

3. An apparatus as in claim 1, further comprising gutter means for catching the ink jet from the nozzle means, the sensor means comprising a sensor attached to the gutter for sensing the ink clog in response to a failure of the ink jet to impinge against the gutter at a predetermined position.

4. An apparatus as in claim 1, in which the sensor means senses the ink clog in response to excessive pressure in the nozzle means.

5. An apparatus as in claim 1, further comprising alarm means, the control means being constructed to energize the alarm means in response to the sensor means sensing the ink clog.

6. An apparatus as in claim 1 or 2, further comprising air supply means, the control means controlling the air supply means to cause air to flow through the nozzle means after controlling the solvent supply means to supply solvent to the cap means.

* * * * *